(No Model.) 2 Sheets—Sheet 2.
J. O. BROWN.
CUTTING APPARATUS FOR MOWERS OR HARVESTERS.
No. 369,095. Patented Aug. 30, 1887.
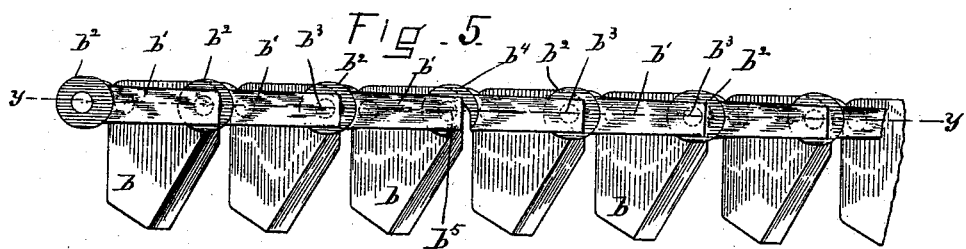
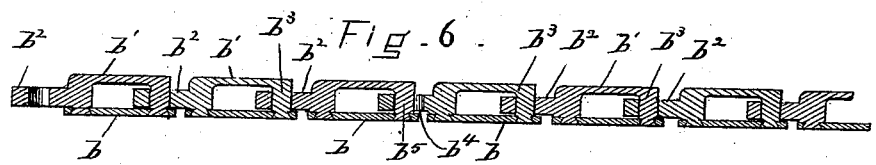
WITNESSES:
H. Brown
A. D. Harrison
INVENTOR:
James O. Brown
by Knight, Brown & Crosley
Attys

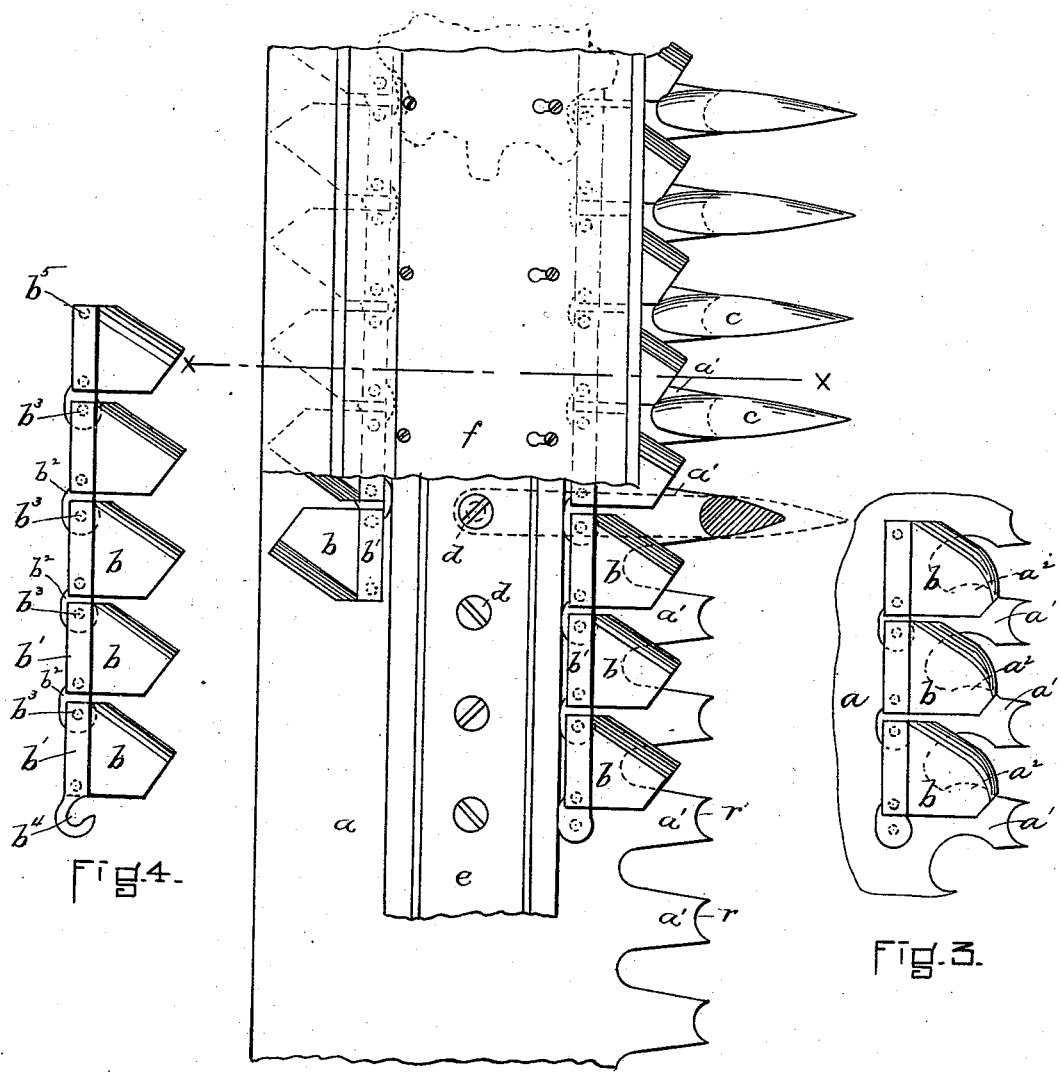

UNITED STATES PATENT OFFICE.

JAMES O. BROWN, OF BOSTON, MASSACHUSETTS, ASSIGNOR TO THE BROWN ENDLESS CUTTER COMPANY, OF SAME PLACE.

CUTTING APPARATUS FOR MOWERS OR HARVESTERS.

SPECIFICATION forming part of Letters Patent No. 369,095, dated August 30, 1887.

Application filed March 20, 1886. Serial No. 195,945. (No model.)

*To all whom it may concern:*

Be it known that I, JAMES O. BROWN, of Boston, in the county of Suffolk and State of Massachusetts, have invented certain new and useful Improvements in Cutting Apparatus for Mowing-Machines or Harvesters, of which the following is a specification.

This invention relates to that class of mowing-machines or harvesters in which the knives are arranged on an endless chain and move progressively instead of reciprocating.

The invention consists in the improvements hereinafter described, in the finger-bar on which the endless chain and the knives thereon are supported, and to which the guard-fingers, which co-operate with the knives in cutting the grass, are attached, and in the form of the knives and of the fixed edges on the finger-bar, with which they co-operate.

Of the accompanying drawings, forming a part of this specification, Figure 1 represents a top view of a portion of my improved finger-bar, showing a part of the knives and guard-fingers. Fig. 2 represents a section on line $x\,x$, Fig. 1. Fig. 3 represents a top view of a portion of the finger-bar, showing a different form of cutting-knife. Fig. 4 represents a top view of a series of knives. Fig. 5 represents a top view of parts of two series or gangs of knives. Fig. 6 represents a section on line $y\,y$, Fig. 5.

In the drawings, $a$ represents the finger-bar, which constitutes a support for the knives or cutters $b\,b$ and the guard-fingers $c\,c$, co-operating therewith, the knives being connected in an endless chain or series and moved progressively by means of sprocket-wheels supported by said plate, one of said wheels being positively rotated by the motion of the machine, as shown, for example, in Letters Patent No. 211,377, granted to me January 14, 1878. One of the sprocket-wheels is shown in dotted lines in Fig. 1. The guard-fingers are attached by bolts $d$ to the finger-bar, and their rear portions bear against the under side of said plate, while their forward portions bear on the under sides of the teeth or ledger-plates, hereinafter described. On the upper side of said plate is a bar or rib, $e$, affixed preferably by the bolts $d$, and serving as a guide for the knives $b$ and as a support for the adjustable cover $f$, whereby the knives are protected against dust, dirt, &c.

In carrying out my invention I make the finger-bar $a$ from a single piece or plate of steel of uniform thickness, using, by preference, saw-plate steel, and provide its forward edge with teeth or projections $a'$, which extend forward into the slots or openings $c'$ in the guard-fingers, through which the knives pass, and constitute the wearing-surfaces or ledger-plates, which co-operate with the moving knives $b$ in cutting the grass, the under surfaces of said knives $b$ being in close contact with the upper surface of the guard-plate and with the upper surfaces of its teeth or projections. The guard-fingers bear on the under sides of the teeth $a'$, and the guards on said fingers project rearwardly over said teeth, and are separated therefrom by spaces of sufficient width to permit the knives to pass between the guards and the teeth.

The teeth or projections $a'$ have notches or recesses $r$ in their outer ends, which fit against or engage with the correspondingly-formed ends of the openings $c'$ in the guard-fingers, said fingers being thus interlocked or engaged with the guard-plate, so that they cannot turn on the bolts $d$, that attach their rear ends to said plate, a single bolt being thus enabled to secure each guard-finger. The knives $b$ are wider than the spaces between the teeth or projections, so that there is no liability of any knife being tilted downwardly between said teeth by pressure from above and caused to injure its edge and that of the tooth $a'$, with which it co-operates.

It will be seen that by attaching the rigid guard-fingers to the under side of the plate $a$, and extending them forward in contact with the under surfaces of the teeth or projections and interlocking them with the points or extreme forward ends of said teeth, I cause said guard-fingers to stiffen and hold the teeth or projections, so that the latter and the plate $a$ (on which they are formed) may be made thin and light without danger of the breakage of the teeth.

I am aware that a finger-bar having teeth integral therewith and forming ledger-plates is not new; but such plate has never been combined with guard-fingers formed and arranged, as above specified, to stiffen and protect the teeth or ledger-plates.

The ledger-plates for the guard-fingers may be made wider than said fingers and project from the sides thereof, as shown by dotted lines in Fig. 1, so that said teeth can be sharpened by filing without injury to the guard-fingers, and without necessity of removing the same from the guard-plate.

The cutting-edges of the knives and the corresponding edges of the teeth $a'$ may be straight, as shown in Fig. 1. In some cases, however, I prefer to make said edges curved, as shown in Fig. 3, the cutting-edges of the knives having a convex curvature at their outer portions, while the edges of the teeth $a'$, co-operating with said cutting-edges, are concave. This form of the cutting-edges prevents the knives, in moving across the teeth $a'$, from pushing the grass forward or crowding it out from between the knives and the teeth $a'$ without cutting it. This tendency exists to some extent when the knives and teeth are shaped as shown in Fig. 1, but is prevented by the form shown in Fig. 3. The same result might be attained by making the cutting-edges of the knives concave and the corresponding edges, with which they co-operate, convex, as shown in Letters Patent No. 230,858, granted to me August 10, 1880; but the form here shown is better, in that the knives with concave cutting-edges cannot be easily ground, while the convex edges can be ground nearly or quite as conveniently as straight edges.

The edges of the teeth $a'$ opposite the convex edges may have convex projections $a^2$, as shown in Fig. 3, to decrease the width of the spaces between the teeth, and thus enable said teeth to better support the knives in their passage across the teeth and prevent possibility of the knives tipping downward between the teeth.

The last-described feature—viz., the convex cutting-edges of the knives and the concave fixed edges co-operating therewith—may be used in machines having reciprocating knives, as will be readily seen.

The plates or links $b'$ are provided with ears $b^2$, each ear being pivotally connected to the plate $b'$ of the next knife. I prefer to connect the knives permanently in sets or gangs of five, or thereabout, by using permanent rivets $b^3$ to connect said knives, and forming a hook, $b^4$, at one end of the gang to engage with a pin, $b^5$, at the end of the next gang, as shown in Figs. 4, 5, and 6. This construction enables the chain of knives to be disconnected, but reduces the number of separable hooks employed, thus increasing the strength of the construction.

Whenever a knife is broken, the gang of knives to which it belongs can be readily removed and a fresh gang substituted for it, thus avoiding loss of time. The removed gang can be repaired.

I claim—

1. A finger-bar composed of a metal strip or plate of uniform thickness, having a series of teeth or projections at its forward edge integral therewith, forming ledger-plates, and provided with a series of rigid guard-fingers attached to the under side of the plate behind said teeth and in contact with the under surfaces thereof, and interlocked, as described, with the outer ends or points of the teeth, and having guards projecting backwardly over the upper surfaces of the teeth, said guard-fingers holding and stiffening the teeth or ledger-plates, as set forth.

2. In a cutter mechanism for mowing or reaping machines, the combination of a finger-bar composed of a metal sheet or plate of uniform thickness having a series of integral teeth at its forward edge, forming ledger-plates, a corresponding series of guard-fingers attached to said plate and bearing against the under sides of the teeth, and provided with guards projecting over and separated from the teeth by knife-receiving slots or spaces, a longitudinal rib bearing on the upper side of said finger-bar, and an endless chain or series of knives bearing on the upper side of said finger-bar and guided by said rib, the knives at the front side of the rib passing through the slots between the teeth and the guards and co-operating with said teeth, as described, and means for impelling said knives, all substantially as set forth.

3. An endless chain or series of knives composed of gangs secured to links which are permanently riveted together, and are provided with separable connections at the ends of the gangs, whereby any gang can be removed from the endless chain or series, as set forth.

4. A gang of knives secured to links which are permanently riveted together end to end, the links at the ends of the gang having connecting devices whereby the gangs may be separably connected with the corresponding ends of similar gangs, as set forth.

In testimony whereof I have signed my name to this specification, in the presence of two subscribing witnesses, this 13th day of March, 1886.

JAMES O. BROWN.

Witnesses:
C. F. BROWN,
N. H. BROWN.